US009170453B2

(12) United States Patent
Shin et al.

(10) Patent No.: US 9,170,453 B2
(45) Date of Patent: Oct. 27, 2015

(54) LIQUID CRYSTAL DISPLAY PANEL INCLUDING PHOTO CONVERSION LAYER AND LIQUID CRYSTAL DISPLAY DEVICE

(75) Inventors: Jong-Suk Shin, Yongin (KR); Hyun-Suk Jin, Daegu (KR); Mi-Kyung Lee, Gumi (KR); Kyoung-Ho Park, Gumi (KR)

(73) Assignee: LG DISPLAY CO., LTD., Seoul (KR)

( * ) Notice: Subject to any disclaimer, the term of this patent is extended or adjusted under 35 U.S.C. 154(b) by 156 days.

(21) Appl. No.: 13/339,207

(22) Filed: Dec. 28, 2011

(65) Prior Publication Data
US 2013/0010229 A1 Jan. 10, 2013

(30) Foreign Application Priority Data
Jul. 5, 2011 (KR) .......................... 10-2011-0066598

(51) Int. Cl.
*G02F 1/1335* (2006.01)

(52) U.S. Cl.
CPC .. *G02F 1/1336* (2013.01); *G02F 2001/133614* (2013.01)

(58) Field of Classification Search
CPC ............................................... G02F 1/133514
USPC ...................................................... 349/71, 69
See application file for complete search history.

(56) References Cited

U.S. PATENT DOCUMENTS

| 2002/0071071 | A1* | 6/2002 | Sekiguchi et al. ............ 349/106 |
| 2005/0084775 | A1* | 4/2005 | Kawaguchi et al. .............. 430/7 |
| 2006/0007373 | A1* | 1/2006 | Arai et al. ..................... 349/113 |
| 2006/0119915 | A1 | 6/2006 | Sugiura et al. |
| 2006/0238103 | A1 | 10/2006 | Choi et al. |
| 2006/0274228 | A1* | 12/2006 | Komoto et al. ................. 349/71 |
| 2007/0058107 | A1* | 3/2007 | Im et al. .......................... 349/71 |
| 2008/0001528 | A1* | 1/2008 | Eida .............................. 313/501 |
| 2008/0036367 | A1* | 2/2008 | Eida et al. .................... 313/504 |
| 2008/0042552 | A1* | 2/2008 | Cok .............................. 313/501 |
| 2008/0074583 | A1* | 3/2008 | Li et al. .......................... 349/71 |
| 2008/0084706 | A1* | 4/2008 | Roshan et al. ................ 362/601 |
| 2009/0015780 | A1* | 1/2009 | Choi et al. .................... 349/156 |
| 2009/0091689 | A1* | 4/2009 | Rho et al. ....................... 349/69 |
| 2009/0161035 | A1 | 6/2009 | Shao et al. |
| 2009/0180055 | A1* | 7/2009 | Kim et al. ....................... 349/69 |

(Continued)

FOREIGN PATENT DOCUMENTS

CN 1854862 A 11/2006
CN 1881034 A 12/2006

(Continued)

*Primary Examiner* — Edward Glick
*Assistant Examiner* — Sang V Nguyen
(74) *Attorney, Agent, or Firm* — Birch, Stewart, Kolasch & Birch, LLP

(57) ABSTRACT

A liquid crystal display panel and a liquid crystal display (LCD) device are discussed. One monochromatic light is transmitted through a liquid crystal layer and converted into white light having a plurality of wavelengths through upper photo conversion layer, thus improving light transmittance of liquid crystal and reducing a change in a screen color. The liquid crystal display panel includes: first substrate over the backlight unit; a liquid crystal layer over the first substrate to transmit the one monochromatic light; a photo conversion layer over the liquid crystal layer for converting the one monochromatic light into white light; a color filter layer over the photo conversion layer for filtering the converted white light to display color; and a second substrate on the color filter layer.

7 Claims, 4 Drawing Sheets

(56) References Cited

U.S. PATENT DOCUMENTS

| | | | |
|---|---|---|---|
| 2009/0196014 A1* | 8/2009 | Hsiao et al. | 362/84 |
| 2009/0213296 A1* | 8/2009 | Park et al. | 349/62 |
| 2010/0053930 A1* | 3/2010 | Kim et al. | 362/84 |
| 2010/0201922 A1* | 8/2010 | Sugiyama | 349/96 |
| 2011/0309325 A1* | 12/2011 | Park et al. | 257/13 |
| 2012/0019740 A1* | 1/2012 | Kadowaki et al. | 349/61 |
| 2012/0120337 A1* | 5/2012 | Ji et al. | 349/39 |
| 2012/0162573 A1* | 6/2012 | Takahashi et al. | 349/61 |

FOREIGN PATENT DOCUMENTS

| | | | | |
|---|---|---|---|---|
| CN | 101206330 A | 6/2008 | | |
| JP | 62-194227 A | 8/1987 | | |
| JP | 2004-271621 A | 9/2004 | | |
| JP | 2006-162910 A | 6/2006 | | |
| JP | 2006-309219 A | 11/2006 | | |
| JP | 2008-112154 A | 5/2008 | | |
| JP | 2010-134270 A | 6/2010 | | |
| WO | WO-2010106704 | * | 9/2010 | G02F 1/1335 |

* cited by examiner

LIQUID CRYSTAL DISPLAY PANEL INCLUDING PHOTO CONVERSION LAYER AND LIQUID CRYSTAL DISPLAY DEVICE

The present disclosure relates to subject matter contained in priority Korean Patent Application No. 10-2011-0066598, filed on Jul. 5, 2011, which is herein expressly incorporated by reference in its entirety.

BACKGROUND OF THE INVENTION

1. Field of the Invention

The present invention relates to a liquid crystal panel and a liquid crystal display device and, more particularly, to a liquid crystal panel and a liquid crystal display panel capable of enhancing transmittance of liquid crystal and preventing a phenomenon in which a screen color changes.

2. Description of the Related Art

Cathode ray tubes (CRTs) have long taken the lead of the display markets, but currently, a liquid crystal display (LCD) device having the advantage of being lightweight and thin, consuming less power, and being driven at a low voltage, is replacing in the display markets. The LCD device, in which liquid crystal, fluidic organic molecules like a liquid, are regularly arranged like a crystal, displays an image by using qualities that the molecular array is changed by an external electric field.

An image displayed on liquid crystal is formed by a plurality of pixels uniformly divided on a screen, and here, each pixel has red, green, and blue colors. A principle of displaying an image by the LCD will be described with reference to the accompanying drawings.

FIG. 1 is a schematic sectional view of an edge type LCD.

A light emitting diode (LED) 5a is mounted on an inner wall face of an LED assembly 5. Although not shown, a plurality of LEDs 5a are arranged to be spaced apart in a lengthwise direction of a light receiving face of a light guide plate 15.

A quantum dot rail Q is formed to be spaced apart in a direction in which the LEDs 5a output light. Here, the quantum do rail Q refers to an aggregate of particular molecules that convert energy of a light wavelength output from the LEDs 5a into different light wavelength energy. When light of monochromatic wavelength is made incident to the quantum dot rail Q, since molecules for converting light into light of wavelength of blue, red, and green are arranged in the quantum dot rail Q, blue light, red light, and green light are converted and output. The three beams of light output from the quantum dot rail Q are mixed into white light and proceeds toward a light receiving face of the light guide plate 15.

The white light made incident to the light guide plate 15 is made incident to a panel 20 through an upper optical sheet along with light reflected from a reflective sheet 12.

Here, the LED assembly 15, the reflective sheet 12, and the light guide plate 15 constitute a backlight unit 10.

The light made incident to the panel 20 proceeds to a liquid crystal layer 45 through a lower polarizer 21a and a thin film transistor (TFT) substrate 30.

The white light, passing through the liquid crystal layer 45, proceeds to a color filter substrate 50, and is filtered as blue light, green light, and red light by the color filter layer (not shown) and output to an upper polarizer 21b.

Here, the three beams of light has light transmittance that changes according to a voltage applied from the underlying TFT of the liquid crystal layer 45, thus displaying an image of various colors.

However, light of every wavelength is not transmitted 100% through the liquid crystal layer 45. Thus, light transmittance of liquid crystal layer 45 is designed in consideration of the overall transmittance efficiency of three beams of light (e.g., red light, green light, and blue light). In this case, the liquid crystal layer 45 should be designed by maximizing the transmittance efficiency of a particular wavelength, and here, as the particular wavelength, a green wavelength is generally selected.

Thus, the liquid crystal layer 45 is designed such that light transmittance of green wavelength is the highest, and this is the same as designing a value $\Delta nd$ of the liquid crystal layer 45.

$\Delta n$ indicates an index of refraction anisotropy, which is equal to the difference between a parallel index of refraction and vertical index of refraction and equal to the difference between an extraordinary refractive index and an ordinary refractive index. Here, d is the thickness of the liquid crystal layer 45. The product of $\Delta n$ and d is $\Delta nd$, and in general, $\Delta nd$ is when the transmittance of the green wavelength is the highest.

However, the loss of transmittance is greatly generated in light other than the green wavelength.

FIG. 2 is a graph showing transmittance of each wavelength of the visible light region on a screen display unit of the related art LCD device.

The green wavelength range from 495 to 570 nm. As shown in FIG. 2, the transmittance is highest at the green wavelength. However, the transmittance is reduced toward the blue wavelength and red wavelength. The transmittance of blue wavelength is reduced by about 20% and that of the red wavelength is reduced by about 15%.

Quality of resolution, among various qualities of the LCD device, is lowered as the quantity of light in a light guide panel is reduced. Thus, the reduction in the transmittance degrades quality of the LCD device.

Also, color of a screen image is changed according to a change in the thickness of the liquid crystal layer. This will be described in detail with reference to the drawings.

FIG. 3 is a graph showing transmittance of each wavelength in the visible light region on the screen display unit according to the thickness of the liquid crystal layer of the related art LCD device.

Because a process manufacturing LCDs is not performed identically every time, the thickness of the liquid crystal is slightly changed whenever a process is performed. G1 is a spectrum when a process is normally performed according to a design target. G2 is a spectrum when the liquid crystal layer is formed to be thinner than the design target. G3 is a spectrum when the liquid crystal layer is formed to be thicker than the design target.

Transmittance of blue wavelength of G2 is slightly upper than that of G1, and transmittance of yellow wavelength and red wavelength of G2 is slightly lower than that of G1. Thus, the state of G1 is the case in which the screen is white, so it can be noted that the state of G2 is the case in which the white screen is more bluish on the whole than the screen of G1.

Transmittance of yellow wavelength of G3 is slightly higher than that of G1, and transmittance of blue wavelength is slightly lower than that of G1. Thus, it can be noted that the state of G3 is that white screen is slightly more yellowish on the whole than the screen of G1.

Namely, the change in the thickness of the liquid crystal layer causes the change in color on the screen due to the transmittance dispersibility of the wavelengths.

SUMMARY OF THE INVENTION

An object of the present invention is to increase a light transmittance by transmitting monochromatic light in a liquid crystal layer and converting blue, green, and red wavelengths from the monochromatic light in a photo conversion layer at an upper surface of a liquid crystal layer.

According to an aspect of the present invention, there is provided a liquid crystal display panel including: a first substrate; a liquid crystal layer formed on an upper surface of the first substrate and allowing monochromatic light to be transmitted therethrough; a photo conversion layer formed on an upper surface of the liquid crystal layer and converting the monochromatic light into white light; RGB color filter layers formed on an upper surface of the photo conversion layer; and a second substrate disposed on an upper surface of the color filter layer.

Respective quantum dots corresponding to blue light, red light, and green light may be dispersed in the photo conversion layer, so the white light in which blue light, red light, and green light are mixed is obtained from the photo conversion layer.

The monochromatic light may be any one of blue light, red light, and green light.

The photo conversion layer may allow the monochromatic light to be transmitted therethrough, and respective quantum dots corresponding to any two types of light among blue light, read light, and green light are distributed in the photo conversion layer to obtain the white light in which blue light, green light, and red light are mixed from the monochromatic light.

According to another aspect of the present invention, there is provided a liquid crystal display panel including: a first substrate; a liquid crystal layer formed on an upper surface of the first substrate and allowing monochromatic light to be transmitted therethrough; a photo conversion layer formed on an upper surface of the liquid crystal layer and converting the monochromatic light into blue light, green light, and red light; and a second substrate formed on an upper surface of the photo conversion layer, wherein the photo conversion layer includes respective quantum dots corresponding to blue light, green light, and red light.

A lower surface of the photo conversion layer may be formed to be flat.

The liquid crystal display panel may further include: an overcoat layer formed on at least one of the upper and lower surfaces of the photo conversion layer.

The photo conversion layer may be a layer formed by mixing a resin and a plurality of quantum dots or may be a layer formed by dispersing a plurality of quantum dots in an organic solution.

And of the liquid crystal layer may range from 250 nm to 450 nm.

The photo conversion layer may change a wavelength region of incident light by adjusting the size of the quantum dots.

According to another aspect of the present invention, there is provided a liquid crystal display (LCD) device including: a backlight unit including an LED emitting monochromatic light; and a liquid crystal display panel formed on an upper surface of the backlight unit, wherein the liquid crystal display panel includes: a first substrate; a liquid crystal layer formed on an upper surface of the first substrate and allowing monochromatic light to be transmitted therethrough; a photo conversion layer formed on an upper surface of the liquid crystal layer and converting the monochromatic light into white light; RGB color filter layers formed on an upper surface of the photo conversion layer; and a second substrate disposed on an upper surface of the color filter layer.

In the liquid crystal panel and the LCD device according to embodiments of the present invention, since monochromatic light is transmitted through the liquid crystal layer and Δnd of the liquid crystal layer is designed to be optimized for monochromatic light, transmittance dispersibility of wavelengths can be disregarded, thus enhancing the transmittance within the liquid crystal layer.

Also, since the transmittance dispersibility of the wavelength is removed, a change in color of a screen image according to the thickness of the liquid crystal layer can be enhanced.

In addition, unlike the related art in which the backlight unit, the liquid crystal layer, and the color filter layers make the color spreading and management, in an embodiment of the present invention, the photo conversion layer makes the color spreading and management, so the color management efficiency can be improved.

The foregoing and other objects, features, aspects and advantages of the present invention will become more apparent from the following detailed description of the present invention when taken in conjunction with the accompanying drawings.

DETAILED DESCRIPTION OF THE INVENTION

A liquid crystal panel and a liquid crystal display (LCD) device according to an embodiment of the present invention will be described with reference to the accompanying drawings.

In the present document, like numbers refer to like elements throughout although the embodiments are different, and a description of the like elements a first embodiment will be used for those of the different embodiment.

As used herein, the singular forms "a", "an" and "the" are intended to include the plural forms as well, unless the context clearly indicates otherwise.

Figure 1:
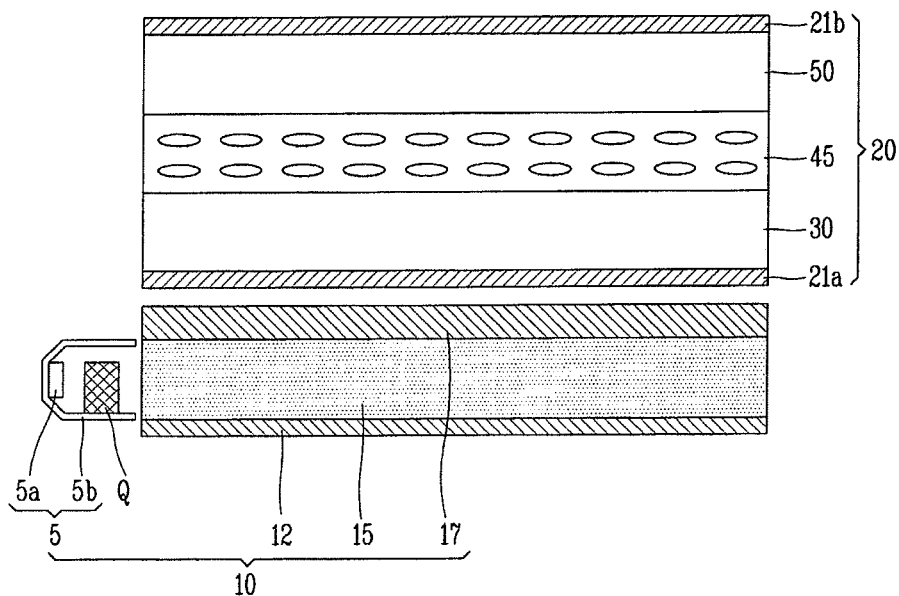
FIG. 1 is a schematic sectional view of an edge type liquid crystal display (LCD) device.
Figure 2:
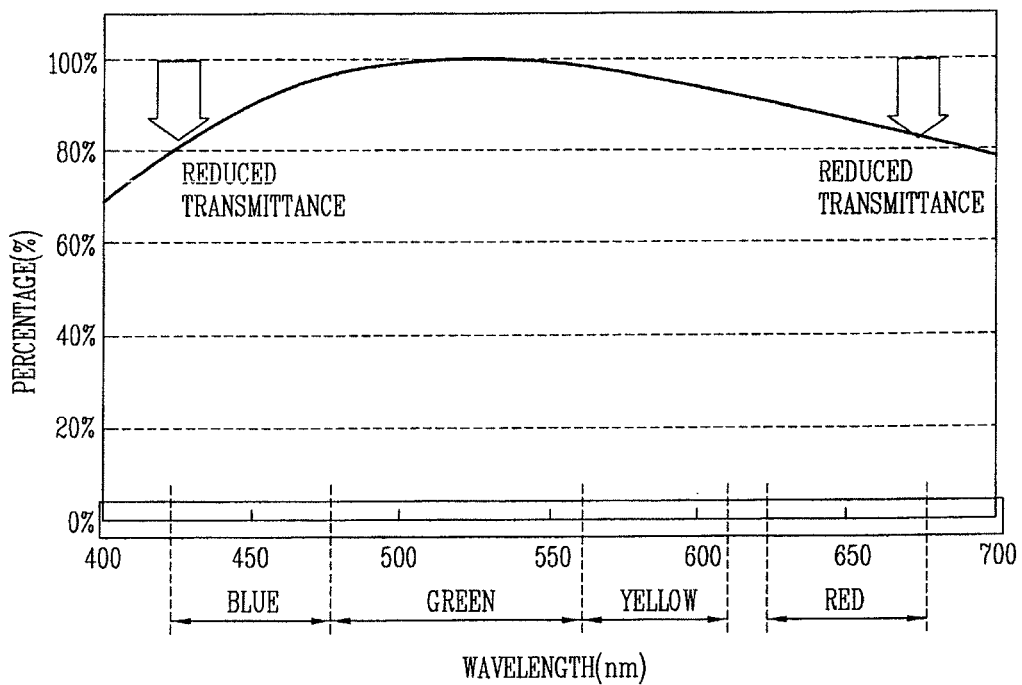
FIG. 2 is a graph showing transmittance of each wavelength of the visible light region on a screen display unit of the related art LCD device.
Figure 3:
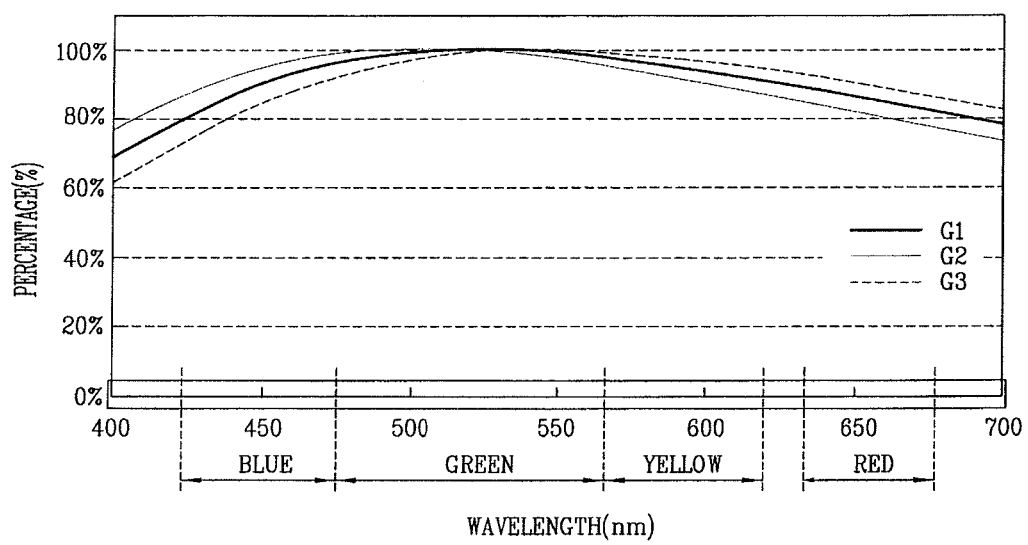
FIG. 3 is a graph showing transmittance of each wavelength in the visible light region on the screen display unit according to the thickness of the liquid crystal layer of the related art LCD device.
Figure 4:
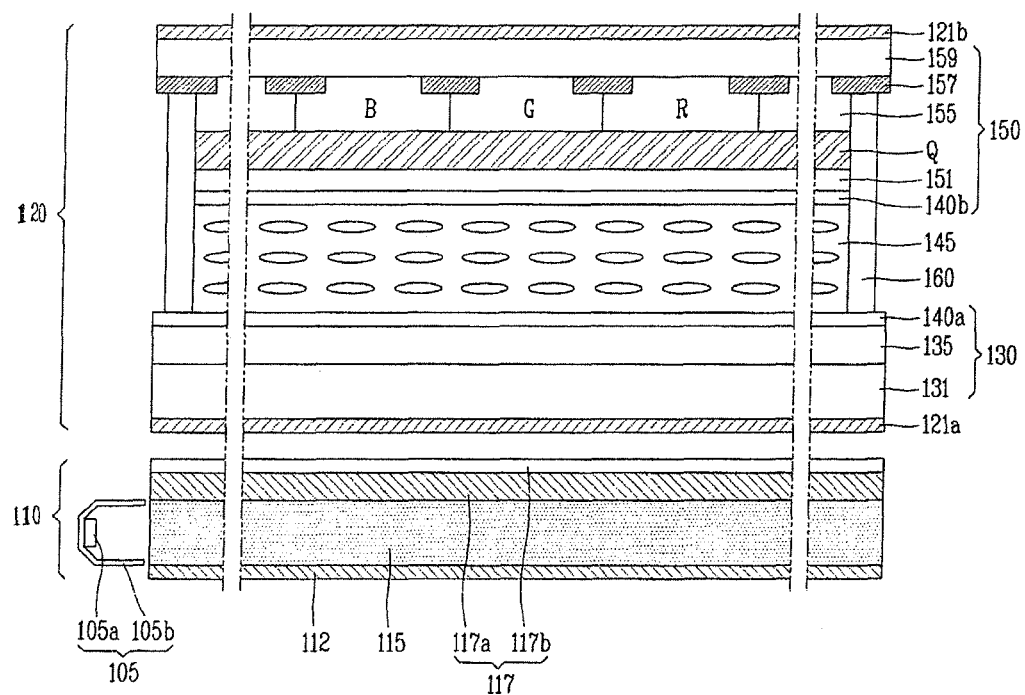
FIG. 4 is a sectional view of an LCD device according to an embodiment of the present invention.

FIG. 4 is a sectional view of an LCD device according to an embodiment of the present invention.

An LCD device according to an embodiment of the present invention includes a backlight unit 110, a liquid crystal display panel 120, and a driving circuit unit (not shown).

The backlight unit 110 includes an LED assembly 105, a light guide plate 115, a reflective sheet 112, and an optical sheet 117.

In the backlight unit 110, a light emitting diode (LED) 105a is used as a light source. The LED 105a is advantageous in that it consumes less power, is thinner, and cheap.

However, the present invention is not limited thereto, and a cold cathode fluorescent lamp (CCFL), an external electrode fluorescent lamp (EEFL), or the like, may also be used as the light source, without being limited to the LED 105*a*.

The LED 105*a* is mounted in an LED housing 105*b*. In the LED housing 105*b*, an LED printed circuit board (PCB) (not shown) is mounted on an inner wall face of the LED housing 105*b*, and the LED 105*a* is mounted on an upper surface of the LED PCB. A plurality of LEDs 105*a* are mounted and arranged along a lengthwise direction of a light input face of the light guide plate 115 on the LED PCB.

The LED PCB serves to drive the LED 105*a*, and the LED housing 105*b* protects the LED 105*a* and serves to make light emitted from the LED 105*a* proceed toward the light input face.

An LED may emit monochromatic light among visible ray region, ultraviolet ray, infrared ray, or the like. Here, preferably, the LED may emit blue light among the visible ray region. The blue light has a wavelength ranging from 400 nm to 500 nm, which is relatively short in the visible ray region (400 nm to 700 nm), so the blue light has relatively high level of energy. Thus, conversion of a portion of the blue light into a wavelength longer than the blue wavelength is transitioning from high level of energy to a low level of energy. Thus, since the conversion of wavelength can be easily performed.

Blue light emitted from the LED 105*a* is made incident to the light input face of the light guide plate 115.

The light guide plate 115 repeatedly performs total reflection, scattered reflection, refraction, diffraction, and the like, on the incident blue light therein to convert the blue light into surface light source having uniform luminance and the outputs the same to upper and lower surfaces thereof.

Here, the reflective sheet 112 reflects the light of the surface light source output to the lower surface such that the light can be output only to the upper surface of the light guide plate 115.

The light of surface light source is made incident to a prism plate 117*a* mounted on an upper surface of the light guide plate 115, and the prism plate 117*a* partially collect and diffuse the incident light of the surface light source to output it toward a protection plate 117*b*. The blue light output from the protective plate 117*b* is made incident to a rear surface of the liquid crystal display panel 120. The prism plate 117*a* and the protective plate 117*b* constitute an optical sheet.

The liquid crystal display panel 120 includes polarizers 121*a* and 121*b*, a thin film transistor (TFT) substrate 130, a liquid crystal layer 145, and a color filter substrate 150. The blue light is made incident from the lower polarizer 121*a* on the lower surface of the liquid crystal display panel 120.

In the LCD device, whether to allow light to pass is adjusted by using the arrangement of molecules of liquid crystal changing according to an electrical signal. Thus, the LCD device requires the use of polarized light. Thus, the liquid crystal display panel 120 uses the polarizers 121*a* and 121*b*. The polarizers 121*a* and 121*b* allow light vibrating in a desired direction among incident light to be transmitted, and light vibrating in other directions to be absorbed or reflected, thereby generating light vibrating in a particular direction.

In order to enhance light efficiency, the polarizers 121*a* and 121*b* are attached on upper and lower surfaces of the liquid crystal display panel 120.

The blue light made incident to the lower polarizer 121*a* is filtered by a wavelength vibrating in only one direction and made incident to the upper TFT substrate 130.

The TFT substrate 130 includes a first substrate 131, a TFT array, an insulating layer, a lower alignment film 140*a*.

The first substrate 131 is stacked on an upper surface of the lower polarizer 121*a*, and the first substrate 131 is a base for forming the TFT. The first substrate 131 may be made of a transparent glass material allowing light to be transmitted therethrough. A buffer layer may be additionally stacked on the first substrate 131 in order to protect and planarize the first substrate 131.

A plurality of TFTs are formed on an upper surface of the first substrate 131. The TFT (not shown) is configured as follows.

A gate electrode is formed on an upper surface of the first substrate 131 and a gate insulating layer is formed on the upper surface in order to insulate the gate electrode and drain and source electrodes. Also, an active layer is formed at an upper portion of the gate insulating layer to form a channel allowing electrons to move between the drain and source electrodes. The active layer is made of semiconductor formed of amorphous silicon or polysilicon.

An insulating layer is stacked on the active layer, and the source and drain electrodes are formed on the insulating layer such that they are in contact with the active layer through ohmic-contact layer.

Here, the gate electrode, the source electrode, the drain electrode, the active layer, and the gate insulating layer form a single TFT.

Although not shown, the plurality of gate electrodes are included in a gate line connecting both side edges in a horizontal direction of the liquid crystal display panel 120 on the plane of the liquid crystal display panel 120. The gate line serves to transfer a gate signal to the TFT.

Also, a data line crosses the gate line on the same layer on which the source and drain electrodes are formed, connecting both side edges of the panel 120. The data line includes a plurality of source electrodes and serves to transfer a data signal to the TFT.

An insulating layer 135 formed of a transparent inorganic insulating film ($SiO_2$ or $SiNx$) is formed on upper portions of the data line and the drain and source electrodes. A protective film includes a contact hole exposing the drain electrode.

A pixel electrode is in contact with the drain electrode through the contact hole and serves to apply a signal voltage applied through the TFT to the liquid crystal layer 145. The pixel electrode may be made of a transparent conductive material such as indium tin oxide (ITO), indium zinc oxide (IZO), or the like, or a reflective metal such as aluminum or silver alloy, or the like.

A lower alignment film 140*a* is coated on an upper surface of the pixel electrode and an upper surface of the insulating layer. The alignment films 140*a* and 140*b* are thin organic films and formed to arrange molecules of the liquid crystal layer 145 in a certain direction.

The blue light filtered by the lower polarizer 121*a* transmits through the TFT substrate 130 and is made incident to a lower surface of the liquid crystal layer 145.

The liquid crystal layer 145 is designed such that it can allow blue light to be best transmitted therethrough. Here, that the light is well transmitted means as follows.

Liquid crystals have molecules that are regularly arranged. This molecular alignment is changed by an external field. When a voltage is not applied, as for light vibrating in one direction incident from the lower surface of the liquid crystal layer 145, a light output from the upper surface of the liquid crystal layer 145 is distorted by 90 degrees from the direction in which the light incident from the lower surface vibrates, according to the molecular alignment of the liquid crystal layer 145.

Here, light of every color may not be distorted in vibration direction by 90 degrees when transmitted through the liquid crystal layer 145. That is, for example, when green light and blue light are transmitted through the liquid crystal layer, the green light is distorted by 90 degrees so as to be transmitted, while the blue light may be distorted by only about 85 degrees so as to be transmitted. Here, the blue light includes 90-degree vector components and vector components smaller than 85 degrees. Among then, only the 90-degree vector components can pass through the upper polarizer 121b. Thus, only the 90-degree vector components of blue light is used to display color, and the transmittance is reduced by the amount of blue light that fails to transmit through the upper polarizer 121b.

Thus, that the light is well transmitted means that the vibration direction of the light made incident in one direction to the liquid crystal layer 145 can be changed by 90 degrees.

The transmittance of the liquid crystal layer 145 with respect to a selected light is dependent on the value Δnd, so the value Δnd is used in designing the transmittance of the liquid crystal layer 145. Here, Δn is an index of refraction anisotropy, d is the thickness of the liquid crystal layer 145. Δnd is the product of the index of refraction anisotropy and the liquid crystal layer 145. Here, the value Δnd is designed to range from 250 nm to 450 nm, blue light can be best transmitted in the liquid crystal layer 145.

The blue light which has passed through the liquid crystal layer 145 is changed by 90 degrees with the vibration direction of the wavelength incident from the lower surface of the liquid crystal layer 145, is made incident to the color filter substrate.

The color filter substrate 150 includes a second substrate 159, a color filter layer 155 and black matrices 157 formed on the second substrate 159, a light conversion layer Q formed on the color filter layer 155, an overcoat 151 formed on the light conversion layer Q, and an upper alignment film 140b formed on the overcoat 151.

Here, the color filter substrate 150 may be separately fabricated from the TFT substrate 130, and with the liquid crystal layer 145 interposed between the color filter substrate 150 and the TFT substrate 130, the color filter substrate 150 may be attached in a facing manner with the TFT substrate 130 by using a seal 160 therebetween.

Blue light output from the liquid crystal layer passes through the upper alignment layer 140b and then is made incident to the light conversion layer Q.

The photo conversion layer Q may also be called a quantum dot layer, and may include quantum dots and a resin. Quantum dots refer to semiconductor particles having a certain size having a quantum confinement effect. The diameter of the quantum dots may generally range from 1 nm to 10 nm.

The quantum dots absorb light from an excitation source, and when the quantum dots reach an energy excitation state, the quantum dots emit energy corresponding to an energy band gap of the quantum dots. Thus, when the size or a material composition of the quantum dots is adjusted, the energy band gap can be adjusted, thus obtaining energy of various levels of wavelengths.

For example, when the size of quantum dots to which light is made incident ranges from 55 to 65 Å, color of red color group may be emitted, when the size of quantum dots to which light is made incident ranges from 40 to 50 Å, color of green color group may be emitted, and when the size of quantum dots to which light is made incident ranges from 20 to 35 Å, color of blue color group may be emitted, and yellow color has a middle size of the quantum dots emitting red and green. According to the trend that the spectrum according to the light wavelength is changed from the red color to blue color, it may be recognized that the size of the quantum dots is sequentially changed from 65 Å to 20 Å, and there may be a slight difference in this numerical value.

Thus, various colors including red, green and blue can be easily obtained according to the quantum size effect from the quantum dots. Thus, colors emitting with respective wavelengths can be generated, and white color and various colors can be implemented by mixing the red, green, blue colors.

Accordingly, the light conversion layer Q may include red light-quantum dots (not shown) and green light-quantum dots (not shown). The green light-quantum dots (not shown) converts a portion of blue light into green light having a wavelength region ranging from 495 nm to 570 nm. The red light-quantum dots (not shown) converts a portion of blue light into red light having a wavelength region ranging from 620 nm to 750 nm. And, blue light which has not been converted into red light or green light is transmitted through the light conversion layer Q as it is. Accordingly, blue light, green light, and red light are output from the upper surface of the light conversion layer Q, and these light beams are mixed to make white light.

Meanwhile, when light output from the LED is green, the light conversion layer Q may include blue light-quantum dots (not shown) and red light-quantum dots (not shown). When light output from the LED is red, the light conversion layer Q may include blue light-quantum dots (not shown) and green light-quantum dots (not shown). When light output from the LED is monochromatic light except red, green and blue light, ultraviolet ray, or infrared ray, the light conversion layer Q may include all of blue light-quantum dots (not shown), red light-quantum dots (not shown), and green light-quantum dots (not shown) to allow light passing through the light conversion layer Q to be filtered as blue, red, and green light.

The quantum dots can be synthesized according to a chemical wet method. The chemical wet method is a method for growing particles by putting a precursor material in an organic solvent. For example, the quantum dots may include a II-VI compound such as CdSe, CdTe, CdS, ZnSe, ZnTe, ZnS, HgTe, HgS, or the like.

Also, the quantum dots may have a core-shell structure. Here, the core may include any one material selected from the group consisting of CdSe, CdTe, CdS, ZnSe, ZnTe, ZnS, HgTe, and HgS, and the shell includes any one of material selected from the group consisting of CdSe, CdTe, CdS, ZnSe, ZnTe, ZnS, HgTe and HgS. Also, a III-V compound such as InP, or the like, can be possible.

An organic legand substituted on the surface of the quantum dots may include pyridine, mercapto alcohol, thiol, phosphine, phosphine oxide, or the like, and serve to stabilize the unstable quantum dots after synthesis.

And, the resin may be a light-transmissive adhesive material. Here, the resin is made of a material which does not mainly absorb the wavelength of blue light output from the liquid crystal layer 145. In detail, the resin may be made of epoxy, silicon, acrylic polymer, glass, carbonate-based polymer, a mixture thereof, or the like. And when the resin has elasticity, it can increase durability against an external impact.

Meanwhile, the photo conversion layer Q is formed as follows.

The quantum dots may be added to the resin, and the resin may be coated on the color filter layer 155 through spin coating or printing.

Alternatively, the resin containing quantum dots may be molded and hardened to form the light conversion layer Q.

Also, the photo conversion layer Q may be formed by injecting an organic solution and dispersing quantum dots therein and hardening the organic solution. The organic solution may include any one of toluene, chloroform, and ethanol, or any of their combination. Here, the organic solution does not absorb the blue wavelength. In this case, the legand of quantum dots is not reacted with the organic solution, a life span and efficiency of the photo conversion layer Q can be enhanced.

The light conversion layer Q may have a flat lower surface to serve as an overcoat layer. Namely, the light conversion layer Q may make the surface of the color filter layer 155 (to be described) flat.

Here, an overcoat layer may be independently formed in addition to the light conversion layer Q. Namely, an overcoat layer may be formed on at least one of upper and lower surfaces of the light conversion layer Q.

Thus, white light output from the photo conversion layer Q is made incident to the color filter layer 155. The color filter layer 155 may also be called an RFB color filter layer 155.

The color filter layer 155 is a resin film including pigment of blue color (B), green color (G), and red color (R) and serves to filter the mixed white light into three types of colors. Namely, a blue filter allows only a blue light to be transmitted therethrough and blocks green and red lights.

A black matrix 157 formed between the blue, green, and red regions of the color filter layer 155 blocks light coming from the respective pixels such that they do not interfere with each other and absorbs light coming from the outside such that the light cannot be reflected. Thus, light is not transmitted through the area where the black matrix 157 is formed.

As a result, as light is transmitted through the layers where the color filter layer 155 and the black matrix 157 are formed, perfect blue, green, and red colors are completed.

Blue light, green light, and red light may transmit through the second substrate and transmit through the upper polarizer, and may be implemented as an image having a plurality of colors mixed therein according to an operation of each pixel.

Hereinafter, another embodiment of the present invention will be described in detail.

In another embodiment of the present invention, the color filter layer 15 is removed and the photo conversion layer Q may play the role of the color filter layer 155. Namely, when the photo conversion layer Q is formed as red light-quantum dots (not shown), green quantum dot (not shown), and blue transmission layer (not shown) and demarcated by the black matrix 157, the quantum dots corresponding to the respective wavelength regions may serves as the color filter layer 155. Here, the reason why the blue transmission layer, rather than blue light-quantum dots, is formed, is because blue light is output from the upper surface of the liquid crystal layer 145b, blue light-quantum dots for converting input light into blue light. The blue transmission layer may be made of transparent polymer, or the like.

Here, when light made incident to the light conversion layer Q is green, the light conversion layer Q includes blue light-quantum dots (not shown) and red light-quantum dots (not shown) and green transmission layer (not shown). When light made incident to the light conversion layer Q is red, the light conversion layer Q includes blue light-quantum dots (not shown) and green light-quantum dots (not shown) and red transmission layer (not shown). When light made incident to the light conversion layer Q is ultraviolet ray or infrared ray, rather than blue light, green light, or red light, the light conversion layer Q includes all of blue light-quantum dots, red light-quantum dots, and green light-quantum dots.

As mentioned above, the photo conversion layer of another embodiment of the present invention may include the same elements as that of an embodiment of the present invention or be formed by the same method as the an embodiment of the present invention. And the rest of the elements except the photo conversion layer also may be the same as those of an embodiment of the present invention.

The effects of the present invention are as follows.

First, the light transmittance of the liquid crystal display panel can be increased.

Figure 5A:
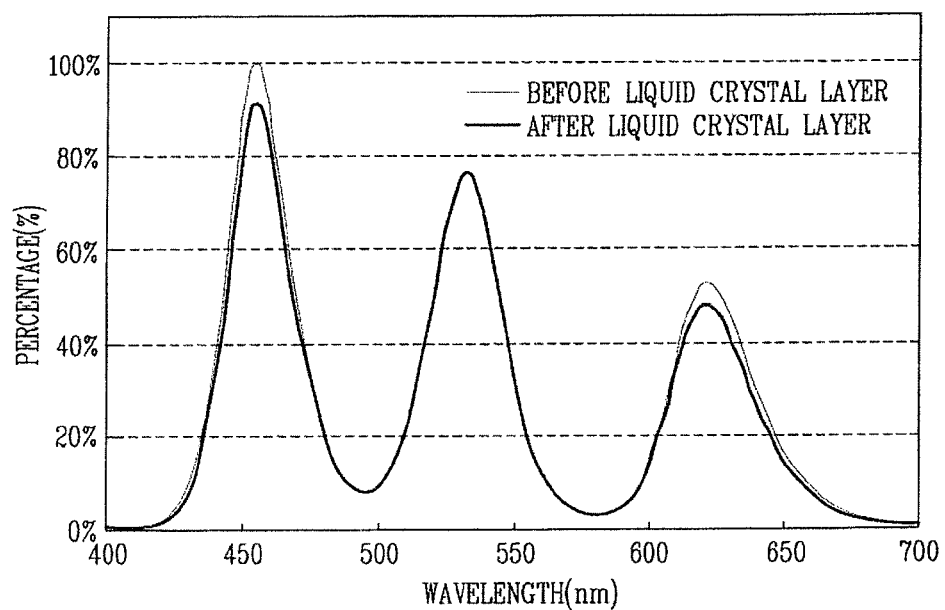
FIG. 5A is a graph showing a spectrum of transmittance of each wavelength within a visible light region in the related art liquid crystal layer.

FIG. 5A is a graph showing a spectrum of transmittance of each wavelength within a visible light region in the related art liquid crystal layer.

In the related art, white light obtained by mixing blue light, green light, and red light is transmitted through the liquid crystal layer, so the transmittance of the liquid crystal layer is designed to be optimized for green light. Thus, except for the green wavelength region (495 nm to 570 nm), the transmittance dispersibility of wavelength in which the transmittance is reduced in the blue wavelength region (450 nm to 495 nm) and the red wavelength region (620 nm to 750 nm) appears. In the drawing, when the transmittance peak value of the blue wavelength region and that of the red wavelength region before and after the transmission of the liquid crystal layer are compared, there is a difference in a maximum of about 5% to 10%.

Figure 5B:
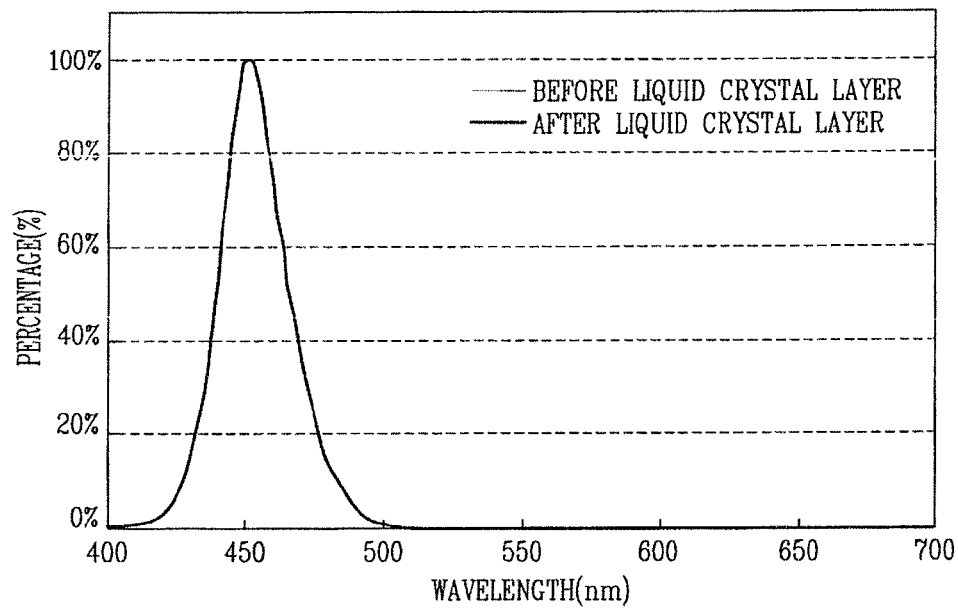
FIG. 5B is a graph showing a spectrum of transmittance of each wavelength within a visible light region in the related art liquid crystal layer.

FIG. 5B is a graph showing a spectrum of transmittance of each wavelength within a visible light region in the related art liquid crystal layer.

Because the transmittance of the liquid crystal layer is designed to be optimized for blue light output from the backlight, there is no loss in the transmittance when compared before and after the transmission of the liquid crystal layer.

Thus, since the transmittance is designed to be nearly 100%, the luminance and screen quality can be expected to be enhanced.

Second, a change in the screen color according to the change in the thickness of the liquid crystal layer can be improved.

In the related art, several wavelengths are transmitted through the liquid crystal layer, the transmittance dispersibility of the wavelengths appears in the liquid crystal layer. Due to this, the color of the screen is easily changed when the thickness of the liquid crystal layer is changed.

However, in an embodiment of the present invention, since monochromatic light is transmitted through the liquid crystal layer and the design of transmittance of the liquid crystal layer is optimized for the transmitted light, thus removing the transmittance dispersibility of wavelength. Thus, the effect of reducing the change in the screen color according to the change in the thickness of the liquid crystal layer can be obtained.

Finally, the color management efficiency of the LCD device is improved.

In the related art, a color tolerance management is required in the backlight unit, the liquid crystal layer, and the color filter layer However, in an embodiment of the present invention, monochromatic light is used and color conversion is performed in the light conversion layer, whereby the management of the transmittance dispersibility of wavelengths is unified into the design of $\Delta$nd of the liquid crystal layer.

Therefore, since the management of color tolerance is made only in the photo conversion layer, only one component manages the color tolerance management compared with in the related art in which three components manage the management of color tolerance. Thus, the efficiency can be considered to be greatly improved.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within What claim is:

1. A liquid crystal display device comprising:
a backlight unit emitting blue light;
a first substrate over the backlight unit;
a liquid crystal layer over the first substrate to transmit the blue light;
a photo conversion layer over the liquid crystal layer including red light-quantum dots and green light-quantum dots for converting the blue light into red light and green light, the photo conversion layer including a resin made of a blue-light transmissive material and having the red light-quantum dots and the green light-quantum dots dispersed therein,
wherein an upper surface of the photo conversion layer is configured to output and mix the blue light, the green light and the red light to make white light;
a second substrate on the photo conversion layer,
wherein the photo conversion layer is disposed between the second substrate and the liquid crystal layer; and
a color filter layer disposed between the photo conversion layer and the second substrate,
wherein the color filter layer includes a lower surface in direct contact with the photo conversion layer such that the color filter layer is configured to receive the white light output by the photo conversion layer, and
wherein the color filter layer includes an upper surface completely covering a black matrix.

2. The liquid crystal display device of claim 1, wherein the liquid crystal layer has a range of 250 nm ≤Δnd ≤450 nm.

3. The liquid crystal display device of claim 1, further comprising a blue light transmitting layer for transmitting the blue light from the backlight unit without any filtering.

4. The liquid crystal display device of claim 1, wherein the photo conversion layer is formed of a hardened organic solution mixed with a plurality of quantum dots, the organic solution being blue-light transmissive.

5. The liquid crystal display device of claim 1, wherein a size of the quantum dots is adjusted to control a wavelength from incident light.

6. The liquid crystal display device of claim 1, wherein a lower surface of the photo conversion layer is flat.

7. The liquid crystal display device of claim 1, further comprising:
an overcoat layer on at least one portion of upper and lower portions of the photo conversion layer.

* * * * *